United States Patent [19]
Haven et al.

[11] 3,832,662
[45] Aug. 27, 1974

[54] VEHICLE COOLING SYSTEM CONDITION MONITOR

[75] Inventors: Harold A. Haven, Fenton; John A. Stewart, Flint, both of Mich.

[73] Assignee: General Motors Corporation, Detroit, Mich.

[22] Filed: Nov. 26, 1973

[21] Appl. No.: 419,093

[52] U.S. Cl.................... 337/40, 73/345, 340/227.1
[51] Int. Cl. ......................................... H01h 37/40
[58] Field of Search ............ 337/37, 38, 39, 40, 41, 337/42, 1, 2, 3; 340/57, 227.1, 229; 73/345

[56] References Cited
UNITED STATES PATENTS

| | | | |
|---|---|---|---|
| 1,824,372 | 9/1931 | Schlaich.............................. | 73/345 |
| 2,273,540 | 2/1942 | Smith................................... | 73/345 |
| 3,161,740 | 12/1964 | Schniers et al. ................ | 340/227.1 |

*Primary Examiner*—Harold Broome
*Attorney, Agent, or Firm*—H. N. Conkey

[57] ABSTRACT

A cooling system condition monitoring apparatus which includes a spring loaded temperature sensitive switch assembly moved by a pressure responsive diaphragm for providing a ground circuit for a warning lamp when the vehicle coolant temperature is above a first preselected level while the cooling system pressure is below a specified level. The apparatus further includes a temperature switch for providing a ground circuit for the warning lamp when the engine is operating above a second predetermined temperature irrespective of the cooling system pressure.

3 Claims, 7 Drawing Figures

PATENTED AUG 27 1974 3,832,662
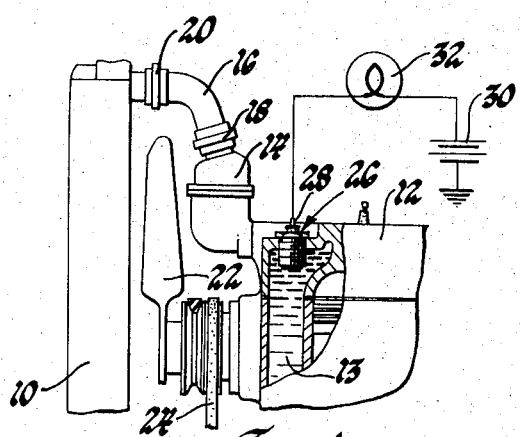
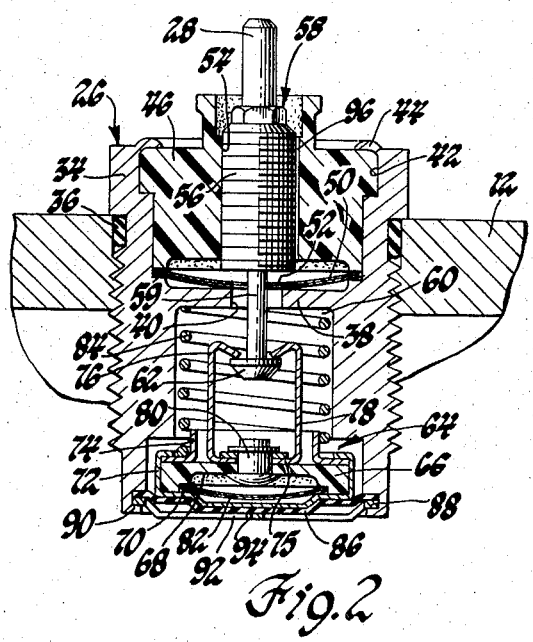

VEHICLE COOLING SYSTEM CONDITION MONITOR

BACKGROUND OF THE INVENTION

This invention relates to vehicle cooling system condition monitors and more particularly to such monitors for providing an indication when the vehicle coolant system temperature exceeds a predetermined level while the cooling system pressure is below a predetermined level and further provides a warning when the cooling system temperature exceeds a second predetermined level irrespective of the cooling system pressure.

Vehicle engines generally use pressurized cooling systems which are sealed by normally closed pressure caps. A malfunction in the cooling system such as a loss of coolant or excessive coolant temperature is usually detected by the use of a temperature responsive switch which effects the energization of a warning device when the temperature as sensed by the switch exceeds the predetermined level. As the normal operating temperature of the coolant in a pressurized cooling system is greater than the boiling temperature of the coolant at atmospheric pressure, the temperature responsive switch is set to provide an indication of a cooling system failure when the temperature sensed thereby is some specified temperature above this normal operating temperature. If for some reason the cooling system fails to pressurize by reason of, for example, missing or improperly installed radiator caps, leaking hoses or faulty water pumps, the coolant temperature cannot exceed the boiling temperature thereof at atmospheric pressure. Consequently, the temperature sensitive switch cannot detect the cooling system malfunction until such time that the coolant has been expelled and the engine has heated up to the actuating temperature of the temperature responsive switch.

It would be desirable to provide an indication of a failure in the cooling system by monitoring the pressure and temperature thereof and providing a signal when the pressure is below a specified value and the temperature of the cooling system exceeds a preselected temperature at which, under normal operating conditions, the cooling system should be pressurized to the specified value. In this manner a signal is provided so as to prevent possible damage to the vehicle engine and a total loss of coolant.

It is the general object of this invention to provide a cooling system condition monitoring apparatus for providing a warning upon the cooling system obtaining a predetermined temperature while the pressure thereof is below a predetermined level and it is a further object of this invention to provide such an apparatus which further provides a warning when the temperature of the cooling system exceeds a second predetermined temperature irrespective of the cooling system pressure.

SUMMARY OF THE INVENTION

A spring loaded temperature sensitive switch assembly is provided for monitoring the temperature of the vehicle cooling system. A pressure responsive diaphragm is responsive to the cooling system pressure for moving the temperature sensitive switch assembly such that at pressures below a preselected level a contact member on the switch assembly is moved to engage a stationary contact. A temperature responsive switch on the temperature sensitive switch assembly is operative in response to the cooling system temperature to ground the contact member on the switch assembly to complete a grounding path for a warning light which provides an indication of the cooling system failure. A second temperature responsive switch is responsive to the temperature of the cooling system for grounding the stationary contact at a second preselected temperature irrespective of the cooling system pressure.

BRIEF DESCRIPTION OF THE DRAWING

FIG. 1 is a part elevation view of a vehicle radiator and the forward part of an internal combustion engine illustrating the mounting of the cooling system condition monitoring apparatus of this invention;

FIG. 2 is an elevation view of the cooling system condition monitoring apparatus illustrating its initial operating state;

FIG. 3 is an elevation view of the cooling system condition monitoring apparatus illustrating its operating state during normal operation of the vehicle engine;

FIG. 4 is an elevation view of the cooling system condition monitoring apparatus illustrating its operating state when the vehicle engine cooling system pressure is below a predetermined minimum and the temperature thereof exceeds a predetermined level; and FIG. 5 is an elevation view of the cooling system condition monitoring apparatus illustrating its operating state when the vehicle engine is overheated.

DESCRIPTION OF THE PREFERRED EMBODIMENT

Referring to FIG. 1, there is illustrated a vehicle cooling system including a vehicle radiator 10 and an engine 12. The engine 12 includes fluid passages such as at 13 which are connected to the top portion of the radiator 10 by means of a thermostat housing 14, a hose 16 and suitable connections 18 and 20. A conventional fan 22 is mounted between the engine 12 and the radiator 10 and is driven by a fan belt 24.

The cooling system condition monitoring apparatus 26 of this invention is threaded into the engine 12 as shown and extends into the fluid passage 13 so as to be exposed to the cooling system temperature and pressure. The cooling system condition monitoring apparatus 26 includes an electrically conductive output terminal 28 which is coupled to the positive terminal of a vehicle battery 30 through an indicator lamp 32. The negative terminal of the vehicle battery 30 is grounded to the vehicle engine 12 in the conventional manner.

Referring to FIG. 2, the monitoring apparatus includes an electrically and thermally conductive casing 34 which is threaded into the engine 12 as shown in FIG. 1 and, as such, is electrically coupled to the engine 12. An O-ring 36 provides a fluid seal between the casing 34 and the engine 12. The casing 34 includes a spring retainer 38 having an aperture 40 centrally located therein. The casing 34 also includes a recessed portion 42, the inner shoulder of which cooperates with a rolled over portion 44 to retain an insulator block 46 which is spaced from the spring retainer 38 to form a housing for a bimetal temperature responsive snap disc 50 having an aperture 52 therein aligned with the aperture 40 in the spring retainer 38. The insulator block 46 has a threaded opening 54 which cooperates with a threaded portion 56 of an electrically conductive contact post 58, an extending portion of which comprises the output terminal 28, to secure the contact post 58. The contact post 58 includes a projecting member 59 which extends through the apertures 40 and 52 into a chamber 60 formed by the spring retainer 38 and the wall of the casing 34. The projecting member 59 terminates in an extended portion 62.

The state of the bimetal temperature responsive snap disc 50 is illustrated in FIG. 2 when the temperature thereof is below a predetermined temperature which is the upper temperature limit of the vehicle engine 12. Due to the location of the bimetal temperature responsive snap disc 50 relative to the engine 12, the temperature thereof is essentially equal to the temperature of the engine 12. When the temperature of the engine 12 and consequently the temperature of the bimetal temperature responsive disc 50 is at the predetermined upper temperature limit, the bimetal temperature responsive snap disc 50 actuates to make contact between the contact post 58 and the casing 34. Consequently, the indicator lamp 32 of FIG. 1 is grounded through the output terminal 28, the threaded portion 56 of the contact post 58, the bimetal temperature responsive snap disc 50 and the casing 34 to the engine 12 to thereby energize the indicator lamp 32 to provide an indication that the temperature of the engine 12 is at the upper predetermined limit.

The chamber 60 houses a movable temperature sensitive switch assembly 64. The temperature sensitive switch assembly 64 includes an annular insulating member 66 having a well 68 with a stepped shoulder 70. The temperature sensitive switch assembly 64 further includes an outer shell comprised of electrically conductive shell member 72 and an electrically conductive shell member 74 secured to the insulating member 66 by the shell member 72.

A contact member 75 includes a contact arm 76 and a contact arm 78 secured to the insulating member 66 by a fastener 80 which extends through the insulating member 66 and into the well 68, the fastener 80 forming a portion of the contact member 75. The contact arms 76 and 78 are formed to extend radially inward so as to engage the upper surface of the extended portion 62 of the projecting member 58 when the insulating member 66 is positioned downward as illustrated in FIG. 2.

The well 68 of the insulating member 66 and the shell member 72 form a chamber for housing a bimetal temperature responsive snap disc 82 which assumes the temperature in the fluid passage 13. The bimetal temperature responsive snap disc 82 is in the position shown in FIG. 2 when the temperature thereof is below a specified temperature at which the vehicle cooling system pressure within the fluid passage 13 is at a specified pressure under normal operating conditions. When the temperature of the cooling system as monitored by the bimetal temperature responsive snap disc 82 exceeds the predetermined temperature, the bimetal temperature responsive snap disc 82 actuates to make contact between the portion of the fastener 80 extending into the well 68 and the shell member 72.

The temperature sensitive switch assembly 64 is biased to a downward position so that the contact arms 76 and 78 normally engage the upper surface of the extended portion 62 by an electrically conductive compression spring 84 which engages the spring retainer 38 and the shell member 74. The downward movement of the temperature sensitive switch assembly 64 is limited by the engagement of the contact arms 76 and 78 with the extended portion 62.

The vehicle cooling system pressure information is transmitted to the temperature sensitive switch assembly 64 by means of a diaphragm 86 which is secured to the casing 34 in a fluid tight relationship by means of an annular ring 88 and a bent over portion 90 of the casing 34. The annular ring 88 includes cross members 92 and 94 to limit the downward movement of the diaphragm 86. The diaphragm 86 engages the lower surface of the shell member 72 and is comprised of an electrically insulating material. Alternatively, the diaphragm 86 could be comprised of an electrically conductive material with additional means for insulating the diaphragm 86 from the shell member 72.

The diaphragm 86 has one side thereof exposed to the pressure of the cooling system and the other side exposed to atmospheric pressure through an air vent 96 molded in the insulator block 46 adjacent the threaded portion 56 of the contact post 58.

When the temperature of the bimetal temperature responsive snap disc 82 reaches the actuating temperature thereof, the contact arms 76 and 78 are grounded through the fastener 80, the bimetal temperature responsive snap disc 82, the shell member 72, the shell member 74, the spring 84, and the casing 34 to the motor 12.

When the vehicle engine is at rest and the vehicle cooling system pressure and temperature is below the aforementioned levels, the monitoring apparatus 26 assumes the state as illustrated in FIG. 2. Thereafter, when the vehicle engine is started and the coolant system is operating satisfactorily, the cooling system pressure operating on the diaphragm 86 increases to move the contact arms 76 and 78 away from the extended portion 62 of the contact member 58 prior to the coolant reaching the predetermined temperature at which the bimetal temperature responsive snap disc 82 actuates to effect grounding of the contact arms 76 and 78. When the temperature of the coolant reaches the predetermined temperature, the bimetal temperature responsive snap disc 82 actuates to effect grounding of the contact arms 76 and 78 as previously described. The state of the monitoring apparatus 26 at this time is illustrated in FIG. 3. As prior to the cooling system reaching this temperature, the cooling system pressure attained the pressure at which the contact arms 76 and 78 were disengaged from the contact post 58, no ground path is provided for the indicator lamp 32. Consequently, the indicator lamp 32 remains extinguished.

Referring to FIG. 4, if the cooling system fails to pressurize as the coolant temperature increases due to, for example, an improperly installed radiator cap, leaking hoses, etc., the contact arms 76 and 78 remain in engagement with the contact post 58 so that when the cooling system temperature reaches the actuating temperature of the bimetal temperature responsive snap disc 82 the contact post 58 is grounded through the bimetal temperature responsive snap disc 82 to provide a ground path for the indicator lamp 32 to indicate the cooling system malfunction.

Even though the cooling system pressurizes in the proper manner, if the temperature thereof increases to the upper limit due to engine overload, radiator malfunction, etc., the bimetal temperature responsive snap disc 50 actuates as illustrated in FIG. 5 to ground the contact post 58 to effect energization of the indicator lamp 32 to provide an indication of the cooling system malfunction.

The detailed description of the preferred embodiment of this invention for the purpose of explaining the principles thereof is not to be considered as limiting or restricting the invention, since many modifications may be made by the exercise of skill in the art without departing from the scope of the invention.

What is claimed is:

1. A vehicle cooling system condition monitoring apparatus comprising: an electrically conducting casing having one end adapted to be positioned so as to be exposed to the pressure and temperature within the vehicle cooling system; a stationary contact carried within the casing and electrically insulated therefrom; a movable pressure responsive member fixed in sealed relation to said end of the casing, said member being variably biased in a first direction proportional to the cooling system pressure; a temperature responsive assembly coupled to and electrically insulated from the pressure responsive member for movement therewith, said temperature responsive assembly including a contact member for engaging the stationary contact when the temperature responsive assembly is moved in a second direction opposed to the first direction, a bistable temperature responsive and electrically conductive switch responsive to a cooling system temperature in excess of a specified temperature for engaging the contact member, and means for electrically coupling said switch to the casing; biasing means for biasing the temperature responsive assembly in the second direction, the magnitude of said bias being equal to the magnitude of the bias on the movable pressure responsive member in the first direction when the cooling system pressure is at a specified value, the contact member being moved to engage the stationary contact when the bias on the temperature responsive assembly in the second direction exceeds the bias on the pressure responsive member in the first direction and the contact member being disengaged from the stationary contact when the bias on the pressure responsive member in the first direction exceeds the bias on the temperature responsive assembly in the second direction; a power supply; indicating means; and means for series coupling the power supply, the indicating means, the stationary contact and the casing, wherein an indication is provided when the cooling system temperature is greater than the specified temperature while the cooling system pressure is below the specified pressure.

2. A vehicle cooling system condition monitoring apparatus comprising: an electrically conductive casing having one end adapted to be positioned so as to be exposed to the pressure and temperature within the vehicle cooling system; a stationary contact carried within the casing and electrically insulated therefrom; a movable pressure responsive member fixed in sealed relation to said end of the casing, said member being variably biased in a first direction proportional to the cooling system pressure; a temperature responsive assembly coupled to and electrically insulated from the pressure responsive member for movement therewith, said temperature responsive assembly including an electrically insulating block, a contact member carried by the insulating block for engagement with the stationary contact when the temperature responsive assembly is moved in a second direction opposed to the first direction, an electrically conductive shell carried by the insulating block, and a bistable temperature responsive and electrically conductive switch responsive to a cooling system temperature in excess of a specified temperature for electrically coupling the contact member and the shell; an electrically conductive spring engaging the casing and the shell for biasing the temperature responsive assembly in the second direction, the magnitude of said bias being equal to the magnitude of the bias on the movable pressure responsive member in the first direction when the cooling system pressure is at a specified value, the contact member being moved to engage the stationary contact when the bias on the temperature responsive assembly in the second direction exceeds the bias on the pressure responsive member in the first direction and the contact member being disengaged from the stationary contact when the bias on the pressure responsive member in the first direction exceeds the bias on the temperature responsive assembly in the second direction; a power supply; indicating means; and means for series coupling the power supply, the indicating means, the stationary contact and the casing, wherein an indication is provided when the cooling system temperature is greater than the specified temperature while the cooling system pressure is below the specified pressure.

3. A vehicle cooling system condition monitoring apparatus comprising: an electrically conductive casing having one end adapted to be positioned so as to be exposed to the pressure and temperature within the vehicle cooling system; a stationary contact carried within the casing and electrically insulated therefrom; a movable pressure responsive member fixed in sealed relation to said end of the casing, said member being variably biased in a first direction proportional to the cooling system pressure, a temperature responsive assembly coupled to and electrically insulated from the pressure responsive member for movement therewith, said temperature responsive assembly including an electrically insulating block, a contact member carried by the insulating block for engagement with the stationary contact when the temperature responsive assembly is moved in a second direction opposed to the first direction, an electrically conductive shell carried by the insulating block, and a first bistable temperature responsive and electrically conductive switch responsive to a cooling system temperature in excess of a first specified temperature for electrically coupling the contact member and the shell; an electrically conductive spring engaging the casing and the shell for biasing the temperature responsive assembly in the second direction, the magnitude of said bias being equal to the magnitude of the bias on the movable pressure responsive member in the first direction when the cooling system pressure is at a specified value, the contact member being moved to engage the stationary contact when the bias on the temperature responsive assembly in the second direction exceeds the bias on the pressure responsive member in the first direction and the contact member being disengaged from the stationary contact when the bias on the pressure responsive member in the first direction exceeds the bias on the temperature responsive assembly in the second direction; a second temperature responsive and electrically conductive switch responsive to a cooling system temperature in excess of a second specified temperature greater than the first specified temperature for electrically coupling the stationary contact and the casing; a power supply; indicating means; and means for series coupling the power supply, the indicating means, the stationary contact and the casing, wherein an indication is provided when either the cooling system temperature is greater than the first specified temperature while the cooling system pressure is below the specified pressure or when the cooling system temperature is greater than the second specified temperature.

* * * * *